(12) United States Patent
Castellari et al.

(10) Patent No.: US 12,201,060 B2
(45) Date of Patent: Jan. 21, 2025

(54) WORK EQUIPMENT PROVIDED WITH A DAMPER ELEMENT

(71) Applicant: EMAK S.P.A., Bagnolo in Piano (IT)

(72) Inventors: Lorenzo Castellari, Montecchio Emilia (IT); Andrea Bertani, Reggio Emilia (IT); Andrea Catellani, Bagnolo in Piano (IT)

(73) Assignee: EMAK S.P.A., Bagnolo in Piano (IT)

( * ) Notice: Subject to any disclaimer, the term of this patent is extended or adjusted under 35 U.S.C. 154(b) by 396 days.

(21) Appl. No.: 17/428,329

(22) PCT Filed: Mar. 6, 2020

(86) PCT No.: PCT/IB2020/051965
§ 371 (c)(1),
(2) Date: Aug. 4, 2021

(87) PCT Pub. No.: WO2020/194090
PCT Pub. Date: Oct. 1, 2020

(65) Prior Publication Data
US 2022/0104432 A1    Apr. 7, 2022

(30) Foreign Application Priority Data

Mar. 25, 2019 (IT) .................. 102019000004273

(51) Int. Cl.
*A01D 34/90* (2006.01)
*B25F 5/00* (2006.01)
(52) U.S. Cl.
CPC ............ *A01D 34/905* (2013.01); *B25F 5/006* (2013.01)

(58) Field of Classification Search
CPC .............................. A01D 34/905; B25F 5/006
See application file for complete search history.

(56) References Cited

U.S. PATENT DOCUMENTS

| 6,141,223 A * | 10/2000 | Fukushima ......... H01M 50/519 365/228 |
| 7,828,185 B2 * | 11/2010 | Hofmann ................ B25F 5/006 173/217 |
| 8,062,060 B2 * | 11/2011 | Rejman ..................... B25F 5/02 439/527 |
| 2005/0058890 A1 * | 3/2005 | Brazell ................. H01M 50/24 429/97 |
| 2005/0061524 A1 | 3/2005 | Hagan et al. |
| 2007/0240892 A1 * | 10/2007 | Brotto .................... B25D 11/00 83/788 |

(Continued)

FOREIGN PATENT DOCUMENTS

| GB | 2432036 A * | 5/2007 | .......... B25D 17/043 |
| WO | 2011110187 A1 | 9/2011 | |

*Primary Examiner* — Thomas M Wittenschlaeger
*Assistant Examiner* — David G Shutty
(74) *Attorney, Agent, or Firm* — Volpe Koenig

(57) ABSTRACT

A work equipment (10) is described, comprising: —a pole (20); —a work apparatus (W) fixed to a first end of the pole (20), comprising a work tool (30), —a support body (45), fixed to a second end of the pole (20), for housing a power supply battery (P) operatively connected to the work apparatus (W), said power supply battery (P) being removably associated with the support body (45), characterized in that a damper element (95) is positioned between the support body (45) and the power supply battery (P).

4 Claims, 3 Drawing Sheets

(56) References Cited

U.S. PATENT DOCUMENTS

| | | | |
|---|---|---|---|
| 2010/0224666 A1* | 9/2010 | Miyata | B25F 5/006 227/120 |
| 2010/0285345 A1* | 11/2010 | Yang | H01M 50/24 429/100 |
| 2012/0171539 A1* | 7/2012 | Rejman | H01M 50/213 429/100 |
| 2015/0104250 A1* | 4/2015 | Tada | H01M 50/247 403/375 |
| 2015/0214520 A1* | 7/2015 | Nishikawa | B25F 5/006 429/100 |
| 2015/0366133 A1* | 12/2015 | Nojiri | A01D 34/81 30/276 |
| 2021/0237249 A1* | 8/2021 | Fischer | B25B 21/02 |
| 2022/0104432 A1* | 4/2022 | Castellari | A01D 34/905 |
| 2022/0152808 A1* | 5/2022 | Ferrari | A01D 34/905 |

\* cited by examiner

WORK EQUIPMENT PROVIDED WITH A DAMPER ELEMENT

TECHNICAL FIELD

The present invention relates to work equipment and, in particular, portable battery-operated electrical work equipment like those that are commonly used to perform gardening jobs, including for example brushcutters, hedge trimmers and the like.

PRIOR ART

As is known, the work equipment mentioned above generally comprises a pole and a work apparatus fixed to an end of said pole.

Said work apparatus generally comprises an electric motor adapted to move through a transmission means a work tool, for example a cutting tool.

The electric motor and the transmission means are normally closed and protected inside a relevant casing, which is rigidly fixed without any residual degrees of freedom to an end of the pole so as to be able to be moved thereby, thus directing the work tool.

Then, said work apparatuses comprise a support body generally fixed to the pole at the opposite end to the casing, on which a handle and a hand grip are usually arranged, and defining a battery housing, appropriately provided with electrical connection contacts at the power supply poles of the battery, adapted to house the power supply battery with clearance for promoting the insertion and disengagement thereof.

A known problem of said work equipment is that it is particularly subject to vibrations, which are transmitted by the lower casing to the pole and therefore through the pole to the support body inside which the power supply battery is housed.

This implies vibrations of the power supply battery inside the respective housing, generating noise which is annoying for the operator.

An object of the present invention is to solve said disadvantage of the prior art.

It is a further object of the present invention to achieve such object within the scope of a rational and affordable solution.

Such object is achieved by the features of the invention indicated in the independent claim. The dependent claims outline preferred and/or particularly advantageous aspects of the invention.

DISCLOSURE OF THE INVENTION

In particular, the invention provides a work equipment comprising:
 a pole,
 a work apparatus fixed to a first end of the pole, comprising a work tool,
 a support body, fixed to a second end of the pole, for housing a power supply battery operatively connected to the work apparatus, said power supply battery being removably associated with the support body,
characterized in that a damper element is positioned between the support body and the power supply battery.

Thanks to such solution, the invention makes available a work equipment in which the vibrations generated by the work apparatus are effectively damped/absorbed before being transmitted through the support body to the battery, so as to eliminate (or however limit as much as possible) vibrations thereof and therefore solving the aforesaid problem of the prior art.

Again, another aspect of the invention envisages that the damper element may comprise a yielding portion interposed between the power supply battery and a wall of the battery housing.

Thanks to such solution, the power supply battery is effectively inserted in a battery housing made in the support body and the damper element is interposed between the two, therefore being in direct contact with the power supply battery and with the battery housing so as to make the damping/absorption effect of the vibrations that are transmitted by the support body to the power supply battery and possibly vice versa more effective.

A further aspect of the invention envisages that the yielding portion may be interposed between the power supply battery and a bottom wall of the battery housing.

Thanks to such solution, the yielding portion is interposed between the power supply battery and the bottom wall, the wall on which the weight force of the power supply battery mainly acts and onto which it is hooked, further improving the vibration damping/absorption effect, within the context of a particularly rational solution.

Another aspect of the invention envisages that the damper element may comprise a plurality of yielding portions, each interposed between the power supply battery and a respective wall of the battery housing made in the support body.

Thanks to this solution, the damper element is interposed between the power supply battery and all the walls of the battery housing in which it is inserted, notably amplifying the damping/absorption effect of the vibrations which would otherwise be transmitted to the battery.

Again, another aspect of the invention envisages the damper element being able to be housed in a housing seat obtained in the battery housing of the support body.

Thanks to this solution, the interface of the damper element with the support body is improved, making the vibration damping/absorption action more effective, within the context of a particularly simple and rational solution.

A further aspect of the invention envisages that the damper element can be made of synthetic rubber, preferably EPDM, an acronym for ethylene propylene diene monomer.

Thanks to such solution, the damper element is made of a material that is particularly suitable for the damping/absorption of vibrations, within the context of a rational and affordable solution.

BRIEF DESCRIPTION OF THE DRAWINGS

Further features and advantages of the invention will be more apparent after reading the following description provided by way of a non-limiting example, with the aid of the accompanying drawings.

BEST WAY TO ACTUATE THE INVENTION

With particular reference to such figures, 10 indicates overall a work equipment, of the electrically powered type, typically a portable work tool, e.g. of the type of those that are commonly used to perform gardening jobs.

In the example illustrated, the work equipment 10 is a brushcutter, i.e. an equipment that is carried in the arms of a user and typically used for cutting grass or hedges.

However, it is not excluded that the aspects of the present description can be applied to other work equipment such as, for example, hedge trimmers or the like.

The work equipment 10 comprises a work apparatus, indicated overall by W, which is placed at a first end of a support pole 20, in particular the lower end during the step of using the work equipment 10.

Figure 1:
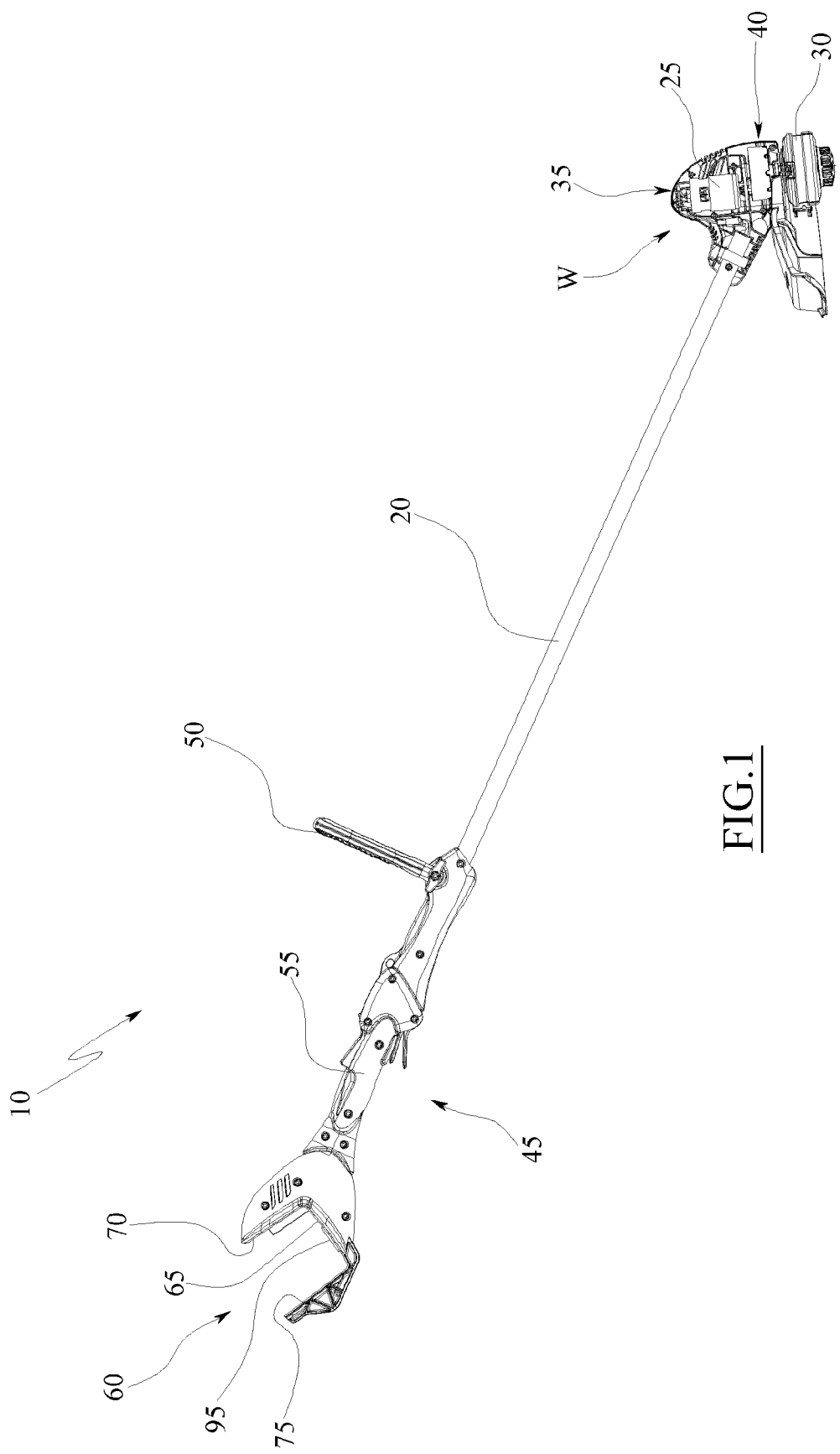
FIG. 1 is a perspective view of a work equipment according to an embodiment of the present invention with a casing of a work apparatus open.

As illustrated in FIG. 1, the work apparatus W essentially comprises a motor having a drive shaft, and a tool 30 kinematically connected to the drive shaft, so as to be able to be activated in movement by the motor itself.

The motor 25 is an electric motor, e.g. a direct current electric motor, which generally comprises a rotor coaxially and solidly fixed to the drive shaft and a stator that surrounds the rotor.

The stator can comprise permanent magnets adapted to generate a fixed magnetic field, whereas the rotor can comprise electrical windings adapted to be crossed by current, so as to generate an induced magnetic field which, by interacting with the fixed magnetic field of the stator, causes the rotation of the rotor, and with it of the drive shaft 50, about an axis of rotation thereof.

The motor 25 is globally contained inside a support casing indicated overall with 35.

The support casing 35 may be made of two or more shells, e.g. two shells, each of which can be made of plastic material, e.g. through an injection moulding process, and which are mutually joined together, e.g. through screws.

Said support casing 35 is rigidly fixed to the support pole 20, i.e. it is fixed to the support pole 20 without any residual degrees of freedom, at said lower end thereof that is in use.

For example, the support casing 35 has a mouth through which the aforementioned end of the support pole 20 is inserted, substantially to measure, so as to project into the support casing 35 itself.

In this way, any oscillations of the support pole 20 with respect to the support casing 45 are prevented.

The support casing 35 is then rigidly fixed to the support pole 20, so as to prevent the extraction of the support pole 20 itself through the mouth, by means of fixing members, e.g. threaded members.

The tool 30 is positioned outside the support casing 35, e.g. below the motor 25, and can be kinematically connected to the drive shaft so as to be placed in rotation about an axis of rotation which is preferably parallel to the axis of rotation of the drive shaft.

For example, the tool 30 may be a cutting tool 30 and may comprise a central body that bears a plurality of flexible cutting filaments (not illustrated as known in themselves), which project radially from the central body towards the outside.

For example, the tool 30 can be kinematically connected to the drive shaft through a transmission, indicated overall by 40, which can define a different transmission ratio from 1 between the drive shaft and the tool 30.

For example, the transmission 40 can be adapted to define a speed reduction between the drive shaft and the tool 30.

The work equipment 10 then comprises a support body 45, rigidly fixed to the support pole 20, e.g. at a second end thereof opposite the first end onto which the support casing 45 of the work apparatus W is rigidly fixed, in particular the upper end during the step of using the work equipment 10.

The support body 45 is presented like a substantially box-shaped body, e.g. with an irregular shape, and may be made of two or more shells, e.g. two shells, each of which can be made of plastic material, e.g. through an injection moulding process, and which are mutually joined together, e.g. through screws.

The support body 45 further has a handle 50 and a grip 55 that allow the user to embrace the work equipment 10.

During normal use, the user, in the erect position, grasps the handle 50 and the grip 55, so as to incline the support pole 20 downwards and bring the work apparatus W in proximity to the ground.

The support body 45 further provides a battery housing 60 adapted to house with (reduced) clearance a power supply battery P, which is inserted removably inside it and operatively connected to the work apparatus W.

In particular, the battery housing 60 is defined by a bottom wall 65 and by a front wall 70 and an opposing rear wall 75 that rise from the bottom wall 65, e.g. seamlessly and substantially squared therewith, and that define with said bottom wall 65 a substantially C-shaped structure, in the example open at the top and the side.

In practice in the example, the power supply battery P is adapted to be inserted into said housing so as to be able to be embraced on three sides by the support body 45.

It is not excluded that the battery housing 60 may further comprise two opposing side walls that connect the front wall 70 and the rear wall 75.

It is also not excluded, furthermore, that the battery housing 60 can further comprise an infill cover adapted to close the battery housing 60 itself at the top once the power supply battery P has been inserted.

Said battery housing 60 further comprises guides 80 adapted to guide the power supply battery P during the step of insertion and disengagement into the battery housing 60, and adapted to define a shape coupling with corresponding elements made on the power supply battery P itself so as to hook and maintain effectively in position the power supply battery P once it has been inserted into the battery housing 60.

For example, said guides 80 comprise grooves made on the rear wall of the battery housing 60, that extend starting from an upper end thereof, distal from the bottom wall 65, and preferably as far as a height that is at least equal to half of the extension of the rear wall 75 itself.

For example, said grooves are adapted to define a prismatic coupling with relevant teeth, with a conjugated shape to that of the grooves, made on the power supply battery P.

Said guides then comprise recesses, e.g. with a substantially L-shaped plan, made on the bottom wall 65, e.g. adapted to define a shape coupling with corresponding support feet, with a conjugated shape to the recesses made on the bottom wall 65, projecting at the bottom from a base wall of the power supply battery P.

For example, although not illustrated, further guides 80 can also be provided on the front wall 70 of the battery housing 60.

The battery housing 60 further comprises electrical connection contacts 85, adapted to be placed in contact with respective power supply poles of the power supply battery P, and adapted to electrically connect the power supply battery P with the electric motor 25 of the work apparatus W.

For example, said electrical connection contacts 85 are configured as metal feet appropriately provided on a base unit 90 made of electrically insulating material, and the base unit 90 is supported by the and fixed to the bottom wall 65 of the battery housing 60.

Preferably, the electrical contacts 85 are arranged in proximity to a connecting edge between the bottom wall 65 and one from among the front wall 70 and the rear wall 75, in the example the front wall 70.

Even more preferably, the electrical contacts 85 are arranged in proximity to guides 80 made on the bottom wall 65.

In this way, the electrical contacts 85 are arranged in proximity to a zone in which the power supply battery P is hooked by means of the guides 80 to the battery housing 60 and therefore to the support body 45, and therefore in a stable contact zone so as to prevent false electrical contacts between the power supply poles of the power supply battery and said electrical contacts 85.

The work equipment 10 then comprises a damper element 95 positioned between the support body 45 and the power supply battery P, which is adapted to dampen/absorb the vibrations that propagate through the support body 45 towards the power supply battery P.

More precisely, the damper element 95 is interposed between the battery housing 60 and the power supply battery P.

Figures 2, 3:
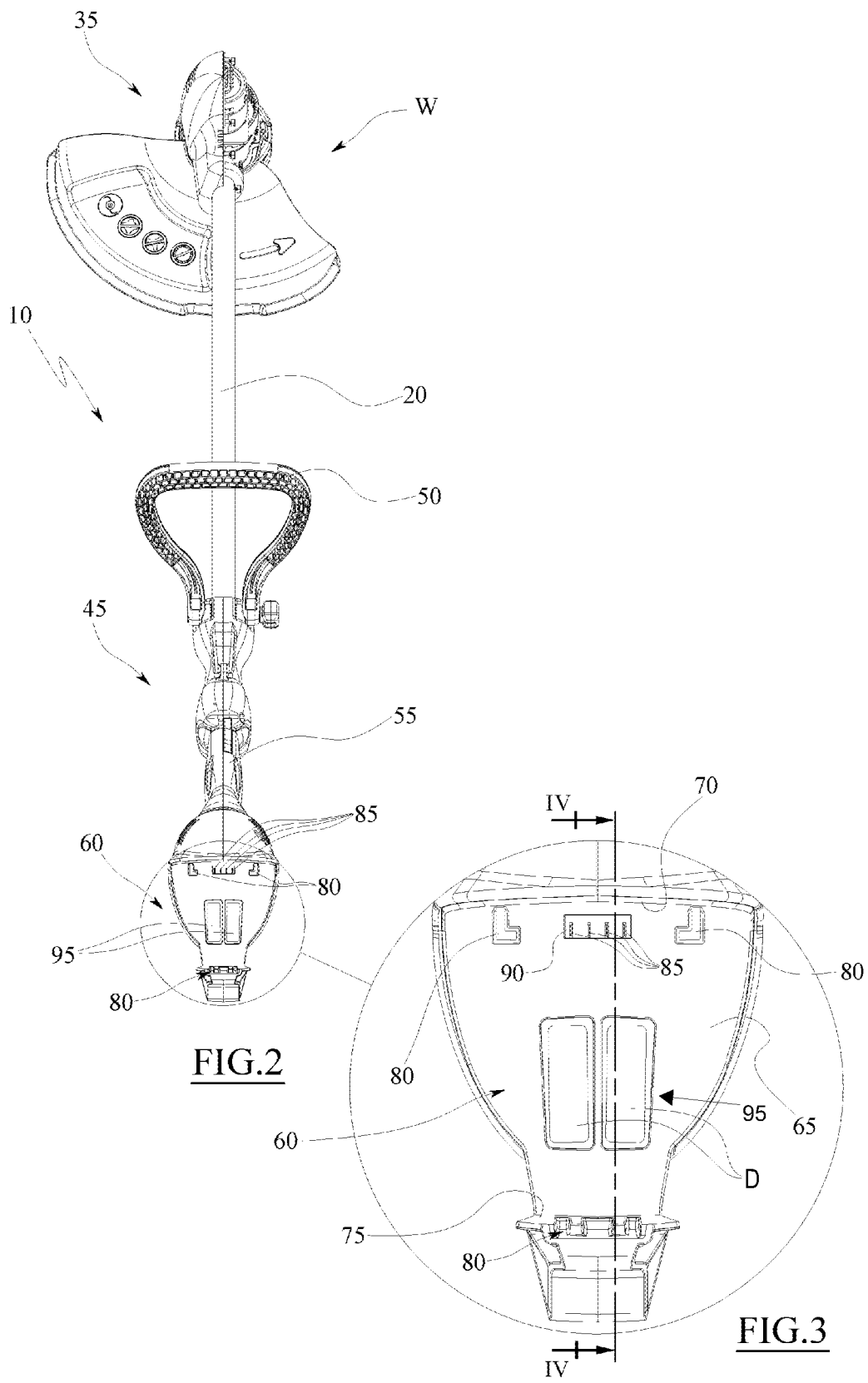
FIG. 2 is a front view from above of the work equipment of FIG. 1.
FIG. 3 is an enlarged view of a portion of FIG. 2 in which a battery housing is illustrated in detail.

As can be seen in FIG. 3, the damper element 95 comprises at least one yielding portion D interposed between a wall of the battery housing 60 and the power supply battery P.

More precisely, the yielding portion D has a surface adapted to be placed in direct contact with the power supply battery P and an opposing surface in direct contact with said wall of the battery housing 60.

The yielding portion D has, for example, a substantially parallelepiped shape with rounded edges, i.e. it has an opposing and mutually parallel lower surface and upper surface and four side surfaces, which connect the lower surface and the upper surface, of which two first opposing and parallel side surfaces and two second opposing and mutually parallel side surfaces substantially squared with the first two side surfaces.

However, it is not excluded that the yielding portion may have a different shape, e.g. cylindrical or spherical or elliptical or any other shape that is however suited to the purpose.

Preferably the yielding portion has a thickness, meaning the distance between the lower surface and the upper surface, comprised between 5 mm and 15 mm, e.g. the yielding portion has a thickness of 10 mm.

Furthermore, the yielding portion may have a length, meaning the dimension along the longitudinal extension, comprised between 20 mm and 60 mm, e.g. the yielding portion has a length of 41 mm.

Again, the yielding portion may have a width, meaning the dimension along the transverse extension, comprised between 8 mm and 30 mm, e.g. the yielding portion may have a width of 13.5 mm.

The damper element 80, i.e. said yielding portion of the damper element 80, is made of a yielding material, e.g. it is made of EPDM, an acronym for ethylene propylene diene monomer, i.e. a synthetic rubber, however it is not excluded that in alternative embodiments it may be made of another yielding material which is however suitable for the purpose.

It is specified that EPDM means a family of group M synthetic rubbers according to the DIN/ISO 1629 classification and according to the ASTM D 1418-19 standard classification.

For example, the yielding portion is interposed between the power supply battery P and the bottom wall 65 of the battery housing 60.

In more detail, the yielding portion is interposed between the power supply battery P and the bottom wall 65 at a centreline zone thereof, i.e. substantially equidistant from the rear wall 75 and from the front wall 70 of the battery housing 60.

Preferably, the damper element 95 comprises more than one yielding portion, conformed as described above, in the example there are two, interposed between the power supply battery P and the wall of the battery housing 60, e.g. the bottom wall 65.

For example, it is possible to envisage that the damper element 95 may comprise a yielding portion for every wall of the battery housing 60, and even more preferably it can comprise more than one yielding portion, placed at each wall of the battery housing 60 and interposed between the power supply battery P and the respective wall.

In detail, it is possible to envisage that the yielding portions interposed between the battery and a same wall of the battery housing 60 are arranged symmetrically with respect to a longitudinal centreline plane of the support body 45.

The damper element 95 can be inserted into a seat 100 obtained in the battery housing 60 of the support body 45.

In the example, each yielding portion of the damper element 95 is inserted, partially and substantially to measure, preferably with pressure into a respective seat 100 specifically made in the battery housing 60 of the support body 45.

For example, the yielding portion can be fixed by interference into said seat 100.

It is not excluded that alternatively the yielding portion may be fixed to the respective seat 100 through other means however suitable for the purpose, e.g. adhesive means.

Preferably the seat 100 is configured so as not to project beyond the wall of the battery housing 60 on which it is made.

This means the seat 100 has an access opening, through which the yielding portion can be at least partially inserted into the seat itself, substantially coplanar to the wall of the housing on which said seat 100 is made.

Figure 4:
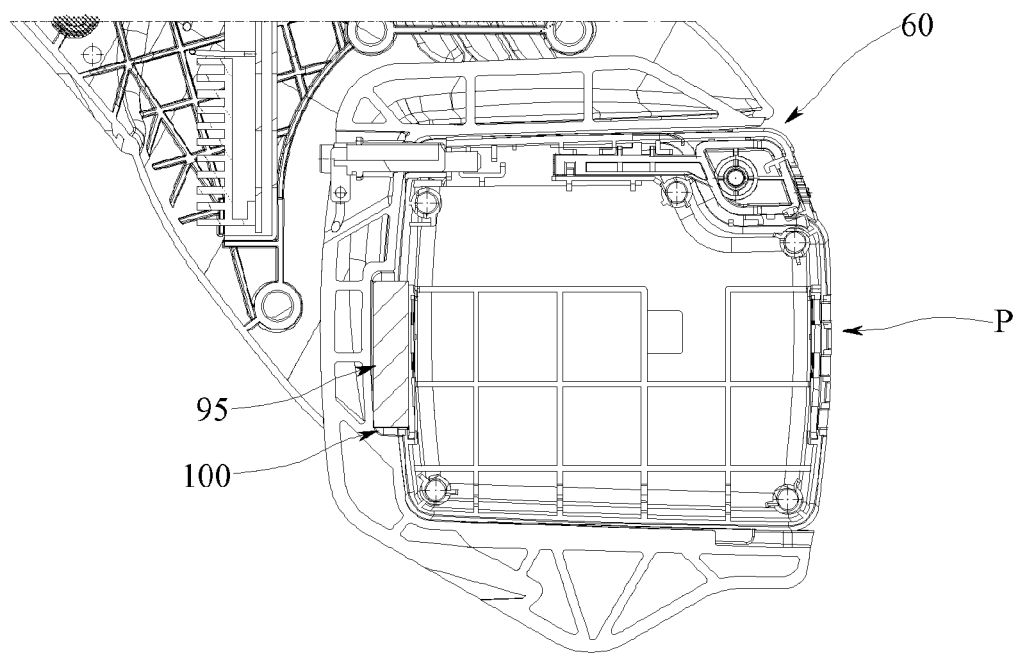
FIG. 4 is a sectional view of FIG. 3 along the plane of section IV-IV, with a power supply battery inserted in the battery housing.

In particular, as can be seen better in FIG. 4, each yielding portion is inserted into the respective seat 100 so as to project beyond (through said access opening), in the example above, the seat 100 itself.

Preferably, the damper element 95, i.e. each yielding portion, can be inserted, partially and substantially to measure, into a housing specifically made on the power supply battery P, e.g. on said base wall thereof.

At this point, the power supply battery P, by means of the weight force acting thereon, is adapted to exert pressure and (elastically) reversibly deform the damper element 95, and only following said deformation the power supply battery P rests on the bottom wall 65 of the battery housing 60 of the support body 45.

The invention thus conceived is susceptible to several modifications and variations, all falling within the scope of the inventive concept.

For example, the damper element can comprise more than one yielding portion all having different shapes and sizes from each other.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A work equipment (10) comprising:

a pole (20);

a work apparatus (W) fixed to a first end of the pole (20), comprising a work tool (30), a support body (45), fixed to a second end of the pole (20), the support body (45) comprising a housing (60) that houses a power supply battery (P) operatively connected to the work apparatus (W), said power supply battery (P) being removably associated with the housing (60), a damper element (95) positioned between the housing (60) and the power supply battery (P), wherein the housing (60) comprises a bottom wall (65) and a front wall (70) and an opposing rear wall (75) that rise from the bottom wall (65), wherein the damper element (95) is positioned between the bottom wall (65) of the housing (60) and the power supply battery (P), wherein the power supply battery (P) is adapted to exert pressure and reversibly deform the damper element (95) in response to an application of a weight force of the power supply battery (P) to the damper element (95), and wherein the damper element (95) is housed in a seat (100) made in the housing (60) of the support body (45), the seat (100) being configured so as not to project beyond the bottom wall (65) of the housing (60), and the power supply battery (P), after deformation of the damper element (95), rests on the bottom wall (65) of the housing (60).

2. The work equipment (10) according to claim 1, wherein the damper element (95) comprises a yielding portion (D) interposed between the power supply battery (P) and the bottom wall (65) of the housing (60).

3. The work equipment (10) according to claim 1, wherein the damper element (95) comprises a plurality of yielding portions (D), each interposed between the power supply battery (P) and a respective wall (65,70,75) of the housing (60) made in the support body (45).

4. The work equipment (10) according to claim 1, wherein the damper element (95) is made of a synthetic rubber.

* * * * *